United States Patent [19]

Jerue et al.

[11] 4,250,775

[45] Feb. 17, 1981

[54] MACHINE TOOL AND METHOD

[75] Inventors: Richard A. Jerue, Bloomfield Hills; Robert M. Ortlieb, Southfield, both of Mich.

[73] Assignee: DeVlieg Machine Company, Royal Oak, Mich.

[21] Appl. No.: 69,583

[22] Filed: Aug. 24, 1979

Related U.S. Application Data

[63] Continuation of Ser. No. 927,564, Jul. 24, 1978, abandoned.

[51] Int. Cl.³ .................. B23B 3/00; B23B 41/00
[52] U.S. Cl. ......................... 82/1 C; 82/1.2; 82/2 B
[58] Field of Search ............. 82/2 R, 2 B, 1 C, 1.2, 82/1.4, 19, 2 B

[56] References Cited

U.S. PATENT DOCUMENTS

| 2,814,964 | 12/1957 | Werth | 82/2 R |
|---|---|---|---|
| 3,237,486 | 1/1966 | Gilbert et al. | |
| 3,279,285 | 10/1966 | Ivins | |
| 4,015,491 | 4/1977 | Peter | 82/2 R |
| 4,016,784 | 4/1977 | Brown | 82/2 R |
| 4,066,380 | 1/1978 | Beck et al. | 408/125 |
| 4,067,251 | 1/1978 | Eckle et al. | 82/1.2 |

Primary Examiner—Harrison L. Hinson
Attorney, Agent, or Firm—Harness, Dickey & Pierce

[57] ABSTRACT

The present invention relates generally to numerically controlled contour machining, and particularly to an apparatus and method for performing such operations on a "bar-type" horizontal boring mill using the spindle bar to vary the cutting radius of the rotating cutting tool and the machine table to feed the workpiece toward the cutting tool.

13 Claims, 12 Drawing Figures

MACHINE TOOL AND METHOD

This is a continuation of application Ser. No. 927,564, filed July 24, 1978, now abandoned.

BACKGROUND AND SUMMARY OF THE INVENTION

The present invention concerns the use of a numerically controlled "bar-type" horizontal boring mill to machine complex internal and external contours of generally circular cross-section which could hitherto be machined only on a numerically controlled lathe. In addition, straight and tapered thread chasing with a single point tool may be performed. These are accomplished using a cross-feed head which is powered by an existing numerically controlled spindle bar to vary the cutting radius of a rotating cutting tool, whereby powered numerical control of the tool radius is achieved. Feed is accomplished by moving the workpiece supporting table toward the cutting tool. The primary advantages of the present invention are that such contours and/or threads may be machined without rotating the workpiece, a particularly significant advantage when dealing with large workpieces and/or workpieces having a plurality of areas requiring machining, and that such contours and/or threads can be machined by users of "bar-type" horizontal boring mills who do not have an available numerically controlled lathe.

Although it has been known in the past to provide boring mills with cross-feed heads for performing facing operations, or for varying the diameter of bored holes, or for simultaneously boring and facing different surfaces of a workpiece, insofar as applicant is aware no one has ever actuated a cutting tool in a radial direction under numerical control, much less by using an existing fully powered numerically controlled spindle bar on a horizontal boring mill to actuate a cross-feed head to vary the radius of a cutting tool during the cutting operation. The substantial advantage of using the spindle bar is that it is a rugged duty machine component designed with sufficient strength to perform heavy machining operations rapidly. The use of an existing numerically controlled spindle bar to vary the radius of a cutting tool during machining permits the machine to advance, perform machining operations and retract as fast, and with the same strength, as the machine tool is designed to perform these operations during conventional machining.

With respect to the forming of threads using a horizontal boring mill, it is known to operate the machine in a milling mode using a milling cutter to form the threads. In such an operation the workpiece and cutter are moved relative to each other on two axes using numerically controlled circular interpolation, with feed being provided by movement of either the spindle bar or the workpiece supporting table. The present invention provides numerous advantages over this technique; specifically, an expensive special purpose cutter is not required, the programming is much simpler, the operation is performed much faster, and a better finish is obtained.

These and other features and advantages of the present invention will become apparent from the subsequent description and the appended claims, taken in conjunction with the accompanying drawings.

BRIEF DESCRIPTION OF THE DRAWINGS

FIG. 3 is a vertical sectional view of a cross-feed head embodying the principles of the present invention;

DESCRIPTION OF THE PREFERRED EMBODIMENTS

Figure 1:
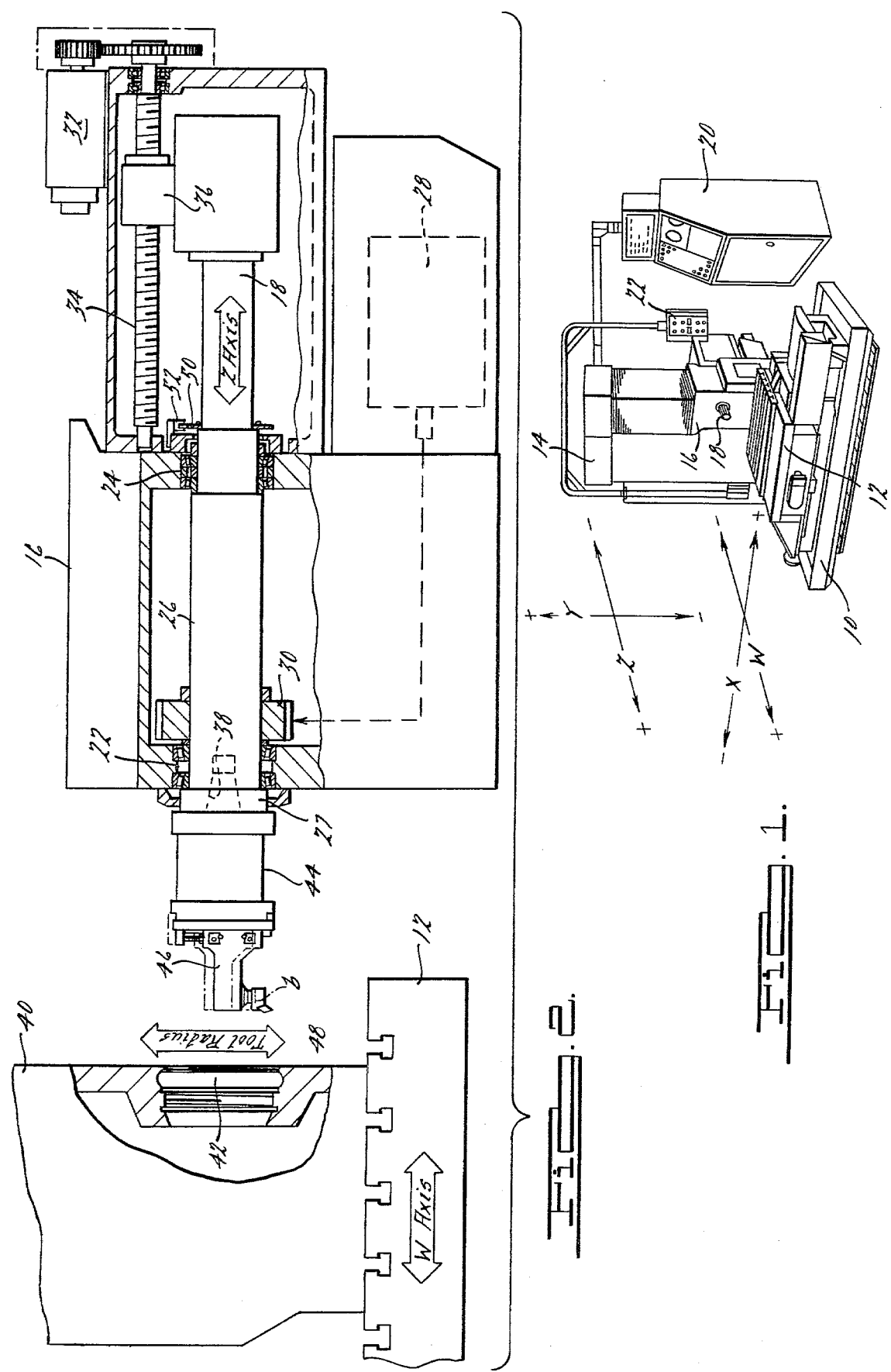
FIG. 1 is a perspective view of a machine tool of the type suited for practice of the present invention.

In FIG. 1 there is illustrated a "bar-type" horizontal boring mill, this type of machine being particularly suited for practicing the present invention. The machine tool shown is a "Jigmil" machining center manufactured by DeVlieg Machine Company, Royal Oak, Michigan, and generally comprises a bed 10, a workpiece supporting table 12 movably supported thereon, a vertical column 14 on which is mounted a vertically movable spindle head 16 which supports a powered spindle bar 18. The machine is controlled by a conventional numerical controller 20 and has manually actuatable controls 21 at the work station. The machine as disclosed is fully conventional in all respects, with the table being mounted for movement along a horizontal "W axis" toward and away from the spindle, and a horizontal "X axis" at right angles thereto. Spindle head 16 is mounted for vertical movement along the "Y axis" and spindle bar 18 is movable towards and away from table 12 along a horizontal "Z axis". These axes are shown in FIG. 1. The capability of the machine which particularly suits it for practice of the present invention is its ability to provide for numerically controlled movement of the table on the "W axis" and the spindle bar on the "Z axis". Any machine tool having this capability is suitable.

Figure 2:
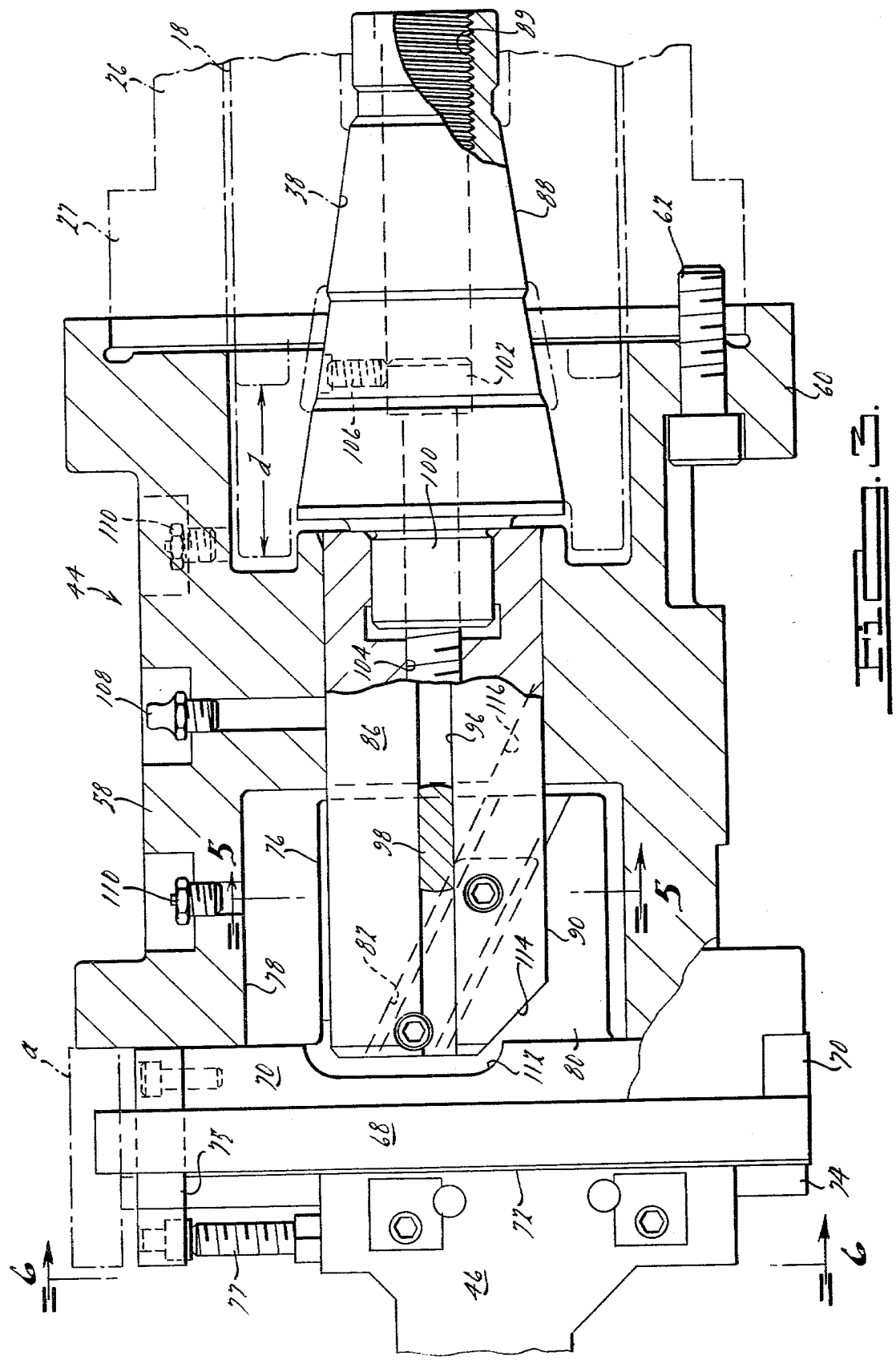
FIG. 2 is a partially diagrammatic fragmentary side elevational view of the machine tool of FIG. 1 incorporating means enabling same to practice the present invention, with certain portions broken away.
Figure 4:
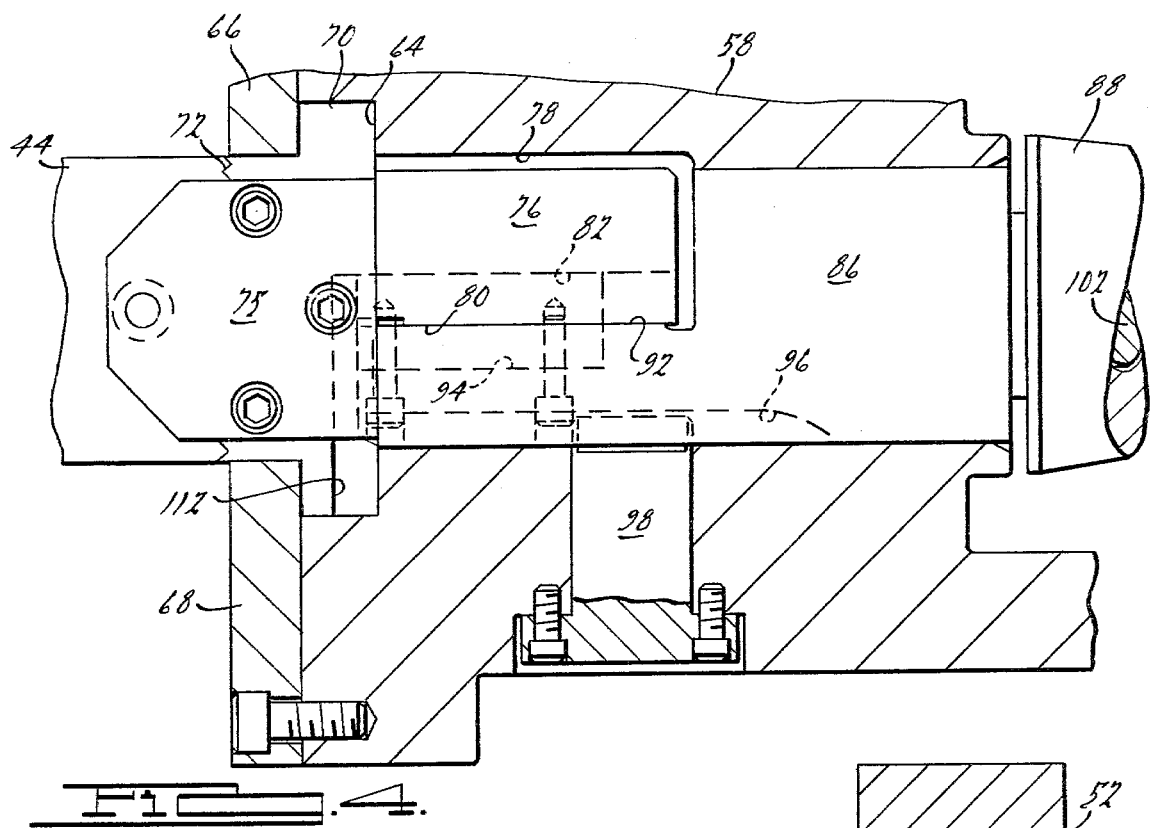
FIG. 4 is a fragmentary horizontal sectional view of the cross-feed head shown in FIG. 3.

Referring to FIG. 2, spindle head 16 incorporates journal assemblies 22 and 24 for rotatively supporting a spindle sleeve 26 in which is slidably disposed spindle bar 18. Spindle sleeve 26 terminates in an external flange 27 on the front face of the spindle head. Rotational power is delivered to spindle bar 18 in the usual manner by means of a spindle rotation drive motor 28 drivingly connected to a drive gear 30 on spindle sleeve 26. Rotational drive is transmitted from the spindle sleeve to the spindle bar in the usual manner by keying them together. Movement of the spindle bar along the "Z axis" is controlled in the usual manner by means of a "Z axis" spindle drive motor 32 which rotates a drive screw 34 to power the spindle bar axially via a follower 36. The outer free end of spindle bar 18 is provided with a tapered tool socket 38 of conventional configuration which communicates with the usual tool attachment power draw bolt (not shown) disposed within the spindle bar. As described, the spindle head is conventional in all respects and is controlled in the usual manner by numerical controller 20 to perform any combination of moves, as defined by the program used. Table 12 is shown in FIG. 2 with a workpiece 40 mounted thereon in the usual manner. Actuation of the work table along the "W axis" by numerical controller 20 is in all respects accomplished with conventional hardware. An example of an unusual contour which may be formed utilizing the present invention is indicated at 42.

Figure 7:
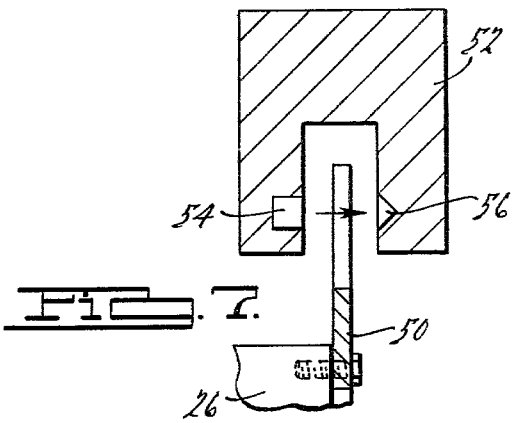
FIGS. 7 and 8 are diagrammatic illustrations of parts of an exemplary spindle bar rotational position encoder forming a part of the present invention.
Figure 5:
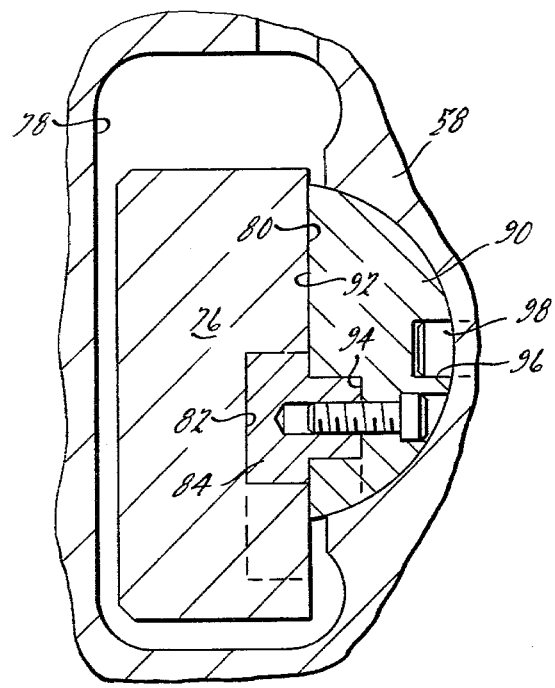
FIG. 5 is an enlarged fragmentary sectional view taken substantially along line 5—5 in FIG. 3.
Figure 6:
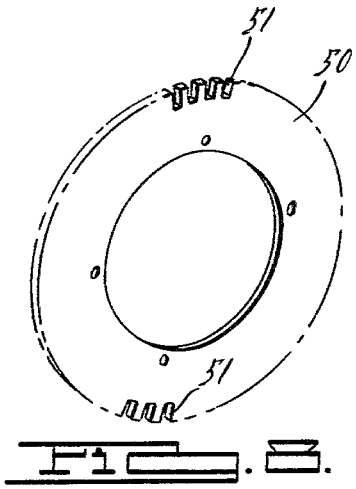
FIG. 6 is a sectional view taken along line 6—6 in FIG. 3, with portions broken away.
Figure 8:
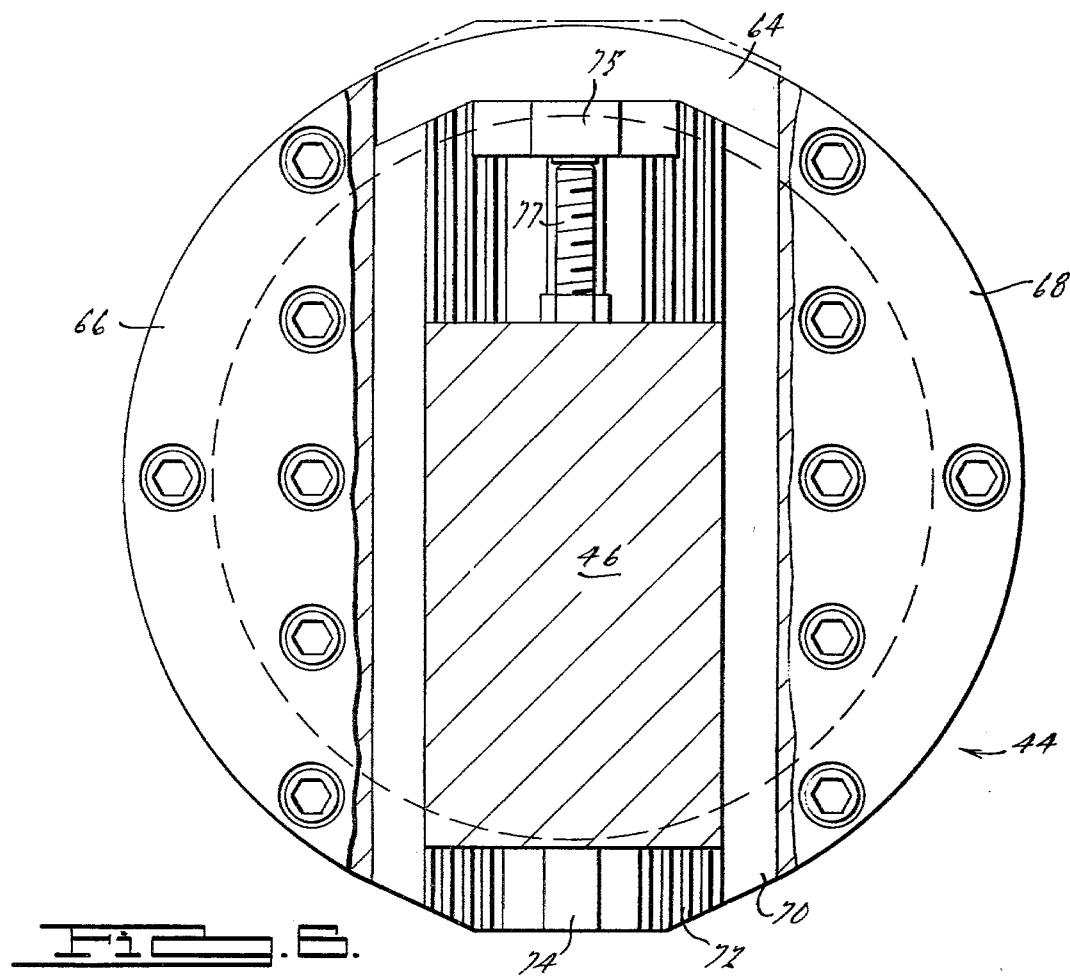

In order to practice the present invention a machine of the aforementioned type is required, and in addition there must be provided a cross-feed head which is capable of transmitting rotational movement of the spindle sleeve to a cutting tool and of converting movement of the spindle bar on the "Z axis" to a powered movement of the cutting tool in a radial direction. Such a cross-feed head is indicated at 44 in FIG. 2, the outer face of which has a tool holder 46 affixed thereto. The constructional design of the cross-feed head is described in detail hereinbelow. The tool holder may be of any suitable design, the one illustrated being constructed in the manner disclosed in application Ser. No. 732,936 filed Oct. 15, 1976, entitled "Presettable Tool Supporting Device". As shown, tool holder 46 is provided with a single point cutting tool 48, mounted in the usual manner. In addition, the machine tool must be provided with means for sensing the rotational position of the spindle bar or sleeve and for encoding such information in a way in which it can be processed in the normal manner by the numerical controller. A number of such devices are commercially available (e.g., mechanical and optical encoders, resolvers, etc.) and for purposes of illustration there is shown an optical encoder of the type comprising a slotted encoder wheel 50 having a plurality of equally spaced radial slots 51 and a reader 52 comprising a light emitting diode 54 positioned to send a beam of light through the slots 51 in encoder wheel 50 to a light sensitive transistor 56, as best seen in FIGS. 2, 7 and 8. As seen in FIG. 2, the encoder is mounted so that wheel 50 rotates with spindle sleeve 26 and reader 52 is stationary. As can be visualized the output of transistor 56 will be a pulse the frequency of which is directly proportional to the speed of rotation of the spindle. By counting these pulses the rotational position of the spindle may be readily determined in the conventional manner so that control functions can be performed by the numerical controller in response thereto. For more precise readings a plurality of circumferentially spaced readers may be provided in a vernier array, in the usual manner.

Figure 9:
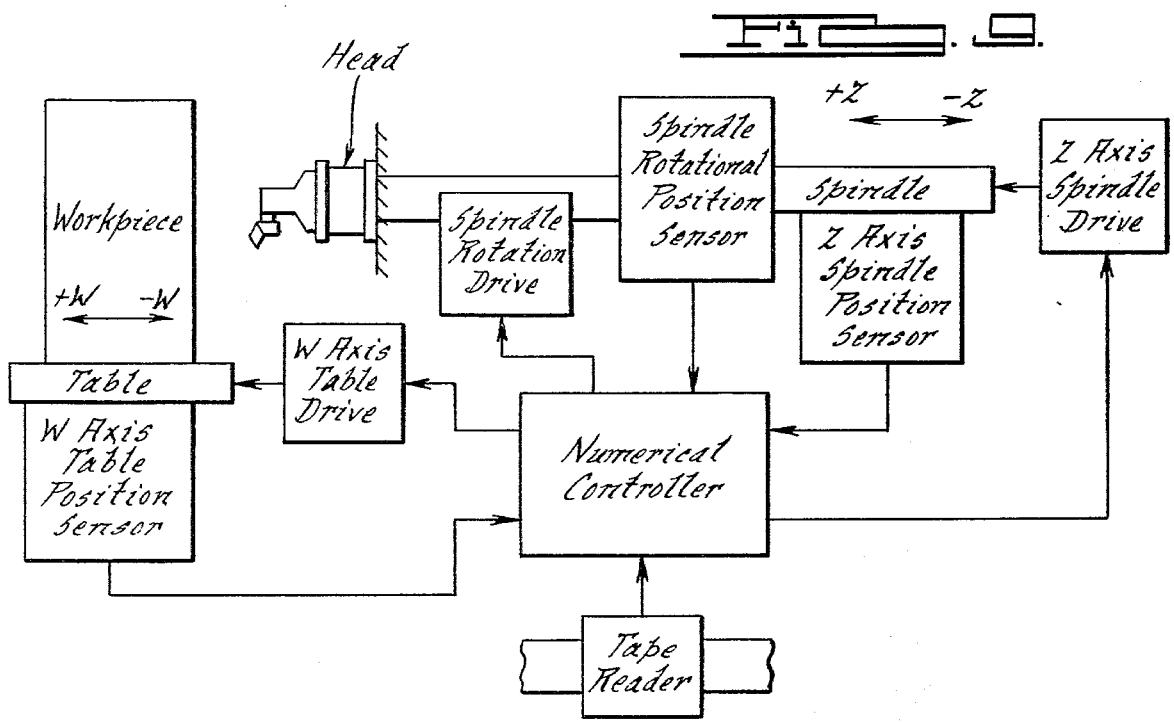
FIG. 9 is a block diagram of the system of the present invention.

The overall system used for practicing the present invention is illustrated in block diagram form in FIG. 9. As can be seen, the numerical controller receives positional information from the "W axis" table position sensor, the spindle rotation position sensor and the "Z axis" spindle drive, and based on the program inputted from a paper tape by means of a tape reader, controls movement of the workpiece by controlling actuation of the "W axis" table drive, "Z axis" movement of the spindle by actuation of the "Z axis" spindle drive and rotation of the spindle by actuation of the spindle rotation drive. Obviously, the desired program may be inputted into the controller by any suitable means other than a tape reader, and in addition, can and in most cases will be capable of performing additional operating and control functions than those set forth in FIG. 9, including all those normally found on machine tools of this type.

With reference to FIGS. 3 through 6, cross-feed head 44 generally comprises a housing 58 having at one end a mounting flange 60 adapted to be rigidly secured to flange 27 on spindle sleeve 26, such as by means of bolts 62 (FIG. 2), and at the opposite end a vertically (as shown) extending slot 64 having bolted end plates 66 and 68 partially overlying the edges thereof to create a T-slot in which is slidably disposed a tool assembly including a tool support member 70 having a serrated surface 72, to which is rigidly affixed tool holder 44, via a retaining element 74, in the manner taught in the aforesaid application for patent. The tool assembly also includes a stop 75 and an adjusting screw 77, the details of which form no part of the present invention. Opposite serrated surface 72, tool support member 70 is provided with a longitudinally inwardly extending boss 76 disposed within a cavity 78 in housing 58 and having a flat face 80 in which is formed an inclined key slot 82 having slidably disposed therein a key 84 affixed to an actuator 86 comprising a standard tapered shank 88 mounted within socket 38 in the normal manner (it may be held by a conventional power draw bolt engaging threads 89) and a longitudinally extending body 90 of generally circular cross-section but having a terminal end portion of semi-circular cross-section having a flat face 92 slidably engaging face 80 of boss 76. Key 84 is rigidly mounted within a slot 94 in face 80. To prevent relative rotation between actuator 86 and housing 58, body 90 is provided with a longitudinally extending slot 96 in which is slidably disposed a guide 98 affixed to housing 58. Body 90 is concentrically located with respect to shank 88 by means of a boss 100 on the latter, and the parts are held together by means of a threaded fastener 102 threadably engaging body 90 at 104. Fastener 102 is locked by a set screw 106. The head may be lubricated via grease fitting 108, pressure relief fittings 110, and associated passageways in the usual manner. To provide adequate clearance for the respective parts, tool support member is relieved at 112 and the end of actuator body 90 is beveled at 114 and 116.

Operation of the apparatus may be readily visualized. Upon actuation of the spindle rotation drive, spindle sleeve 26 and spindle bar 18 rotate in unison at whatever speed has been programmed in the controller. Rotation of spindle sleeve 26 will cause rotation of the entire cross-feed head and associated cutting tool 48. Actuation of the "Z axis" spindle drive, on the other hand, will cause spindle bar 18 to move relative to the sleeve 26 and the housing of the cross-feed head to cause actuator 86 to move longitudinally relative to housing 58 and tool support member 70. This relative movement will cause key 84 and actuator body 90 to cam tool support member 70 in a radial direction by action of the key upon slot 82 in tool support member boss 76. As illustrated in FIG. 3, the spindle bar is shown in its left-most position, in which position the tool holder is at a maximum radius position; i.e., at its lowermost point as shown. Actuation of the "Z axis" spindle drive to cause the spindle bar to move to the right, for example distance d, will cause the actuator to move the same distance, which in turn will cause the tool holder to be cammed radially inwardly, or upwardly as shown, as determined by the slope of cam key 84, until it reaches its minimum radius position illustrated in phantom lines at a in FIG. 3 and b in FIG. 2. In a numerically controlled "bar-type" horizontal boring mill full machining power can be applied to the spindle bar via the "Z axis" spindle drive to thereby accurately position the cutting tool within the range of the setup, and that range may be very easily varied at any point in the machining cycle using the already existing numerical controlled "Z axis" positioning for the spindle bar.

With reference to FIG. 2, it will be visualized that with workpiece 40 mounted upon table 12 of the machine, actuation of the "W axis" table drive in the negative direction will cause the workpiece to advance towards the cross-feed head until the cutting tool engages the workpiece and performs a machining operation. In the practice of the present invention, the machine is programmed so that movement of the cutting tool and workpiece in the feed direction is controlled by movement of table 12 along the "W axis" and positioning of the cutting tool in the radial direction is controlled by actuation of the spindle bar along the "Z axis". Cutting speeds are controlled in the conventional manner. In the present arrangement it therefore becomes possible to feed the cutting tool with respect to the workpiece and also to move it radially in a positive manner under the control of an actuator which is strong enough to perform machining operations.

Figure 10:
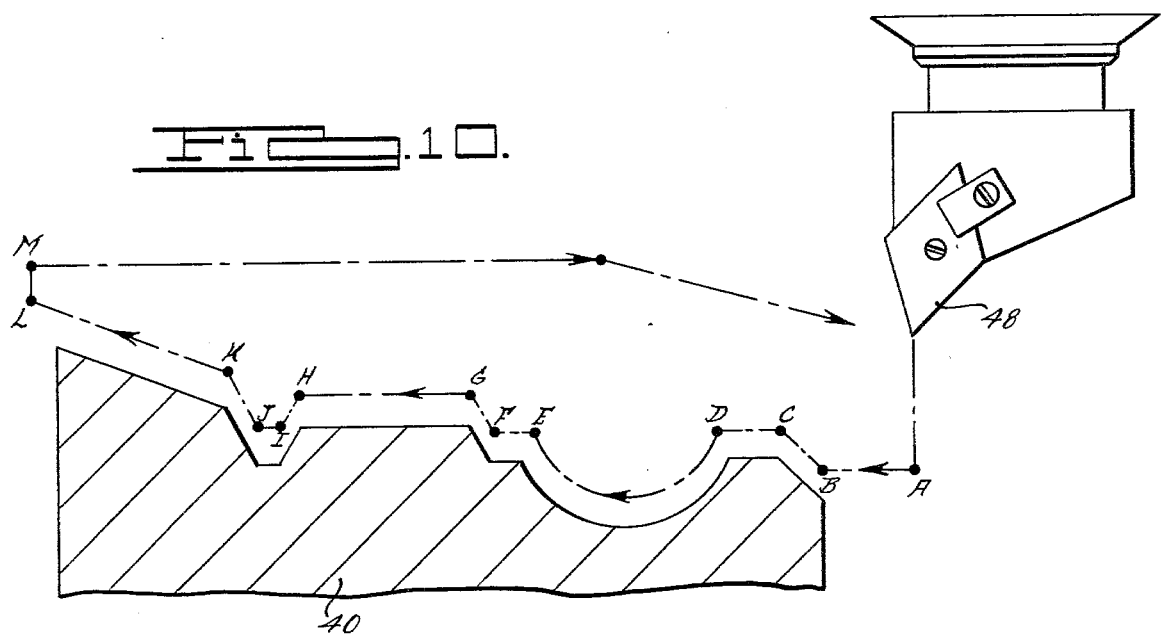
FIG. 10 is a diagrammatic view illustrating the first steps in machining in a complex internal contoured surface having threads thereon.
Figure 11:
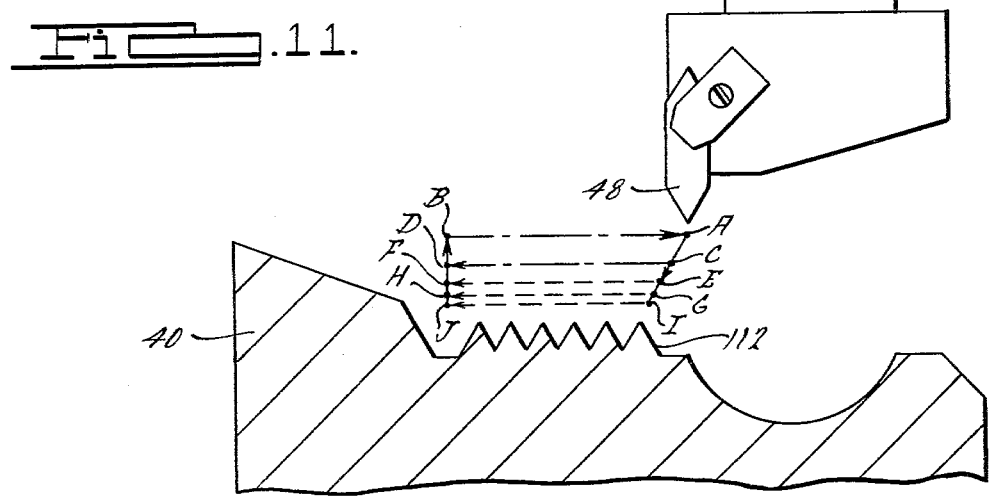
FIG. 11 is a diagrammatic view illustrating the remaining steps of the machining sequence depicted in part in FIG. 10.
Figure 12:
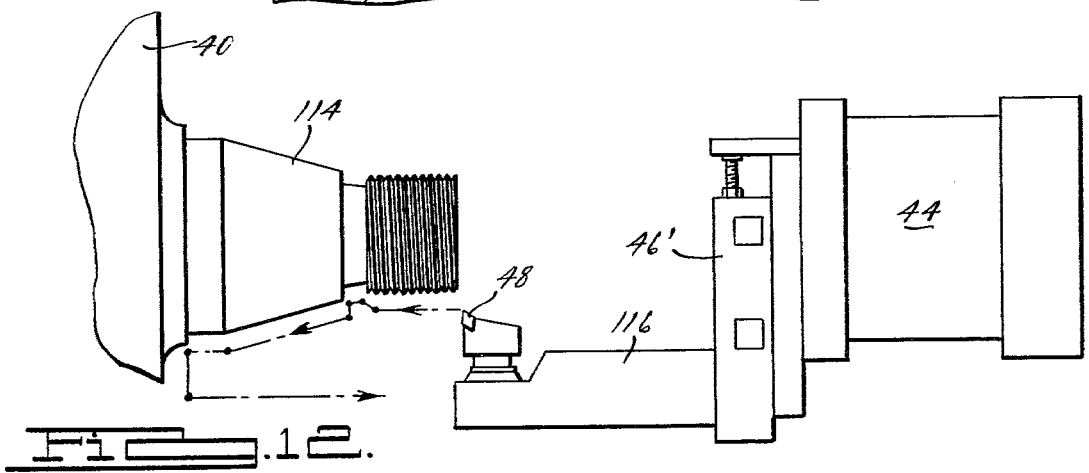
FIG. 12 is a diagrammatic illustration of the manner in which external contours may be formed using the principles of the present invention.

Because of the unique capabilities of the machine of the present invention, otherwise difficult (if not impossible) contours may be machined with a boring mill, several examples of which are illustrated in FIGS. 10 through 12. In FIG. 10 there is illustrated a contoured bore generally similar to that shown at 42 in FIG. 2. Machining contours of this type using prior art techniques can be extremely difficult and time consuming. On the other hand to machine this contour by practicing the present invention is an extremely simple operation. First, a slightly undersized straight cylindrical bore would be rough machined. Thereafter the bore would be finished practicing the present invention. To accomplish this the controller is programmed to provide the desired feeds and speeds in accordance with conventional practice, and is further programmed, in accordance with standard procedures, to perform the following sequence of operations, all to be performed while the cutting tool is rotating. The spindle bar is actuated in the positive "Z" direction to cause the cutting tool to move to point A, and the table is actuated to move in the negative "W" direction until the respective parts reach relative position B, at which time machining is commenced. Between B and C the spindle bar is moved in the negative "Z" direction and the table is moved in the negative "W" direction. Between C and D the table is moved in the negative "W" direction. Between D and E the table moves in the negative "W" direction while the spindle bar is actuated to move first in the positive direction and then in the negative direction in accordance with the program which will generate the contour desired. Between E and F the table is moved in the negative "W" direction. Between F and G the table is moved in the negative "W" direction and the spindle bar is moved in the negative "Z" direction. Between G and H the table is moved in the negative "W" direction. Between H and I the table is moved in the negative "W" direction and the spindle bar is moved in the positive "Z" direction. Between I and J the table is moved in the negative "W" direction. Between J and K the table is moved in the negative "W" direction and the spindle bar is moved in the negative "Z" direction. Between K and L the table is moved in the negative "W" direction while the spindle bar is moved in the negative "Z" direction. This completes the machining. The tool may be rapidly withdrawn by any desired combination of movements of the table in the positive "W" direction and the spindle bar in whatever direction is necessary to clear the machined surface as the cutting tool retracts, until it reaches its initial position, whereupon the sequence may be repeated for the next part. The above sequence assumes that the entire finishing operation is accomplished in one pass. Obviously, it could be split into as many passes as desired.

In FIG. 11 there is illustrated a further refinement of the practice of the present invention whereby a horizontal boring mill is used to chase threads on an internal bore with a single point tool. To perform this operation the machine is programmed in the following sequence, feeds and speeds being programmed in accordance with conventional practice. It is assumed that the path of movement indicated by the line A to B is one in which the tool point clears the workpiece. The tool is first brought to initial position A in any desired manner. The first pass in chasing the threads 112 is caused by actuating the spindle bar in the positive "Z" direction and the table in the negative "W" direction to cause the tool to move from A to C, whereupon radial movement ceases and the table is continued to be actuated in the negative "W" direction to cause the first pass of the thread-cutting operation, with the tool moving from point C to point D. Movement of the tool from point A is initiated in response to the output of encoder 52 at a specific predetermined rotational position of the cutting tool. Upon reaching point D the tool is rapidly withdrawn by actuating the spindle bar in the negative "Z" direction and the tool is rapidly returned to initial position A by actuation of the table in the positive "W" direction. The second pass is performed by actuating the spindle bar in the positive "Z" direction and the table in the negative "W" direction from A to E (starting with the cutting tool in the same predetermined rotational position as before, and advancing it at the same rate), and making the second pass by immediately actuating the table in the negative "W" direction to cause the tool to move from E to F, whereupon it is withdrawn to point B as before and the cycle repeated for a third pass between G and H and a fourth pass between I and J. For each pass tool point starts at point A and movement towards the workpiece is initiated at the same rotational position of the tool, as determined by encoder 52. Tapered threads may be machined by simply reprogramming the controller to provide movement in the desired tapering direction. The path from A to I is sloped to bring the tool down the flank of the thread with each successive pass, and the number of passes is determined in accordance with standard practice. Upon completion of the thread chasing operation the tool is withdrawn in the conventional manner.

In addition to the contour machining of bores, the apparatus and method of the present invention may also be practiced to form external contours. Such might be useful in applications where the workpiece is too large to be rotated on a turning machine, such as the application shown in FIG. 12 where the workpiece 40 is too large to turn but it is desired to machine an integral boss 114 thereon of the configuration illustrated. To form a contour of the type illustrated all that is necessary is to use a different type of tool holder 46' having an extension 116 which holds cutting tool 48 so that it faces inwardly toward the axis of rotation. Such tool holders are conventional and an exemplary one is shown generally in FIG. 12. Programming of the numerical controller in order to perform the sequence of operations is in accordance with the criteria set forth above, with the exception that the cutting tool will be moving radially inwardly instead of radially outwardly in order to engage the material for machining. Other applications of the present invention will undoubtedly become apparent to those skilled in the art.

Insofar as the design of the cross-feed head is concerned, other mechanical devices may be used to translate the axial movement of the spindle bar into radial movement of the cutting tool. For example, instead of a key and slot, the head could be provided with a rack and pinion, pin and cam or bell crank arrangement to accomplish the desired movement.

Thus, there is disclosed in the above description and in the drawings an improved machine tool and method which fully and effectively accomplish the objectives thereof. However, it will be apparent that variations and modifications of the disclosed embodiments may be made without departing from the principles of the invention or the scope of the appended claims.

We claim:

1. A method for machining a contour on a workpiece with a single point tool, comprising the steps of:
    (1) mounting said tool for rotation about a fixed axis and for radial movement transverse to said axis;
    (2) moving the workpiece toward said tool;
    (3) sensing the position of said workpiece;
    (4) sensing the radial position of said tool with respect to said axis; and
    (5) simultaneously controlling said movement of said workpiece and said radial movement of said tool
        (a) in response to said sensed positions, and
        (b) in a predetermined relationship to one another, thereby causing said tool to machine on said workpiece a contour having a progressively changing dimension measured transversely to said axis.

2. A method as claimed in claim 1, wherein said workpiece is moved toward said tool along a path parallel to said axis.

3. A method for machining a contour on a workpiece with a single point tool, comprising the steps of:
    (1) mounting said tool for rotation about a fixed axis and for radial movement transverse to said axis;
    (2) moving the workpiece toward said tool;
    (3) sensing the position of said workpiece;
    (4) sensing the rotational position of said tool;
    (5) sensing the radial position of said tool with respect to said axis; and
    (6) controlling said movement of the workpiece and said radial movement of said tool
        (a) in response to said sensed positions, and
        (b) in a predetermined relationship to one another.

4. A method as claimed in claim 3, wherein said radial movement of said tool occurs simultaneously with said movement of said workpiece.

5. A method for machining a contour on a workpiece with a single point tool using a "bar-type" boring mill having a numerically controlled axially movable spindle bar, comprising the steps of:
    (1) mounting said tool for rotation about the axis of movement of said spindle bar and for radial movement transverse to said axis;
    (2) radially moving said tool in response to axial movement of said spindle bar;
    (3) moving the workpiece toward said tool; and
    (4) simultaneously controlling said movement of said workpiece and said axial movement of said spiindle bar in a predetermined relationship to one another, thereby causing said tool to machine on said workpiece a contour having a progressively changing dimension measured transversely to said axis.

6. A method as claimed in claim 5, comprising the further step of maintaining said tool in a fixed axial position.

7. A method for machining a contour on a workpiece with a single point tool using a boring mill having a numerically controlled axially movable spindle bar and a numerically controlled workpiece supporting table movable toward and away from said spindle bar, comprising the steps of:
    (1) mounting said workpiece on said table;
    (2) mounting said tool for rotation about the axis of movement of said spindle bar and for radial movement transverse to said axis;
    (3) radially moving said tool in response to axial movement of said spindle bar;
    (4) simultaneously moving said table and workpiece toward said tool; and
    (5) controlling said movement of said table and workpiece and said axial movement of said spindle bar in a predetermined relationship to one another to machine a contour on said workpiece.

8. In a machine tool including a rotatable spindle having a free end and being movable longitudinally along its axis of rotation, spindle drive means for rotating said spindle, spindle actuating means for moving said spindle along said axis, a workpiece supporting table movable along a path, and table drive means for moving said table along said path, the improvement comprising means for generating numerically controlled contours and including:
    (1) a machining head mounted at the free end of said spindle, said head comprising
        (a) means for mounting a single point tool thereon so that said tool will rotate with said spindle,
        (b) means for preventing axial movement of the tool mounted thereon, and
        (c) means for moving the tool on said head radially outwardly with respect to said axis in direct response to axial movement of said spindle in one direction, and for moving the tool radially inwardly with respect to said axis in direct response to axial movement of said spindle in the opposite direction; and
    (2) numerical control means programmed to cause said spindle actuating means and said table drive means to operate simultaneously in a predetermined relationship to machine a contour on a workpiece disposed on said table, when said spindle is rotating.

9. In a machine tool including a rotatable spindle having a free end and being movable longitudinally along its axis of rotation, spindle drive means for rotating said spindle, spindle actuating means for moving said spindle along said axis, a workpiece supporting table movable along a path, and table drive means for moving said table along said path, the improvement comprising means for generating numerically controlled threads and including:
- (1) a machining head mounted at the free end of said spindle, said head comprising
  - (a) means for mounting a single point tool thereon so that said tool will rotate with said spindle, and
  - (b) means for moving the tool on said head radially outwardly with respect to said axis in direct response to axial movement of said spindle in one direction, and for moving the tool radially inwardly with respect to said axis in direct response to axial movement of said spindle in the opposite direction;
- (2) position sensing means for sensing the rotational position of said spindle under all operating conditions thereof; and
- (3) numerical control means programmed to cause said table drive means to operate in a predetermined relationship with said position sensing means to machine a contour on a workpiece disposed on said table, when said spindle is rotating.

10. In a machine tool including a rotatable spindle having a free end and being movable longitudinally along its axis of rotation, spindle drive means for rotating said spindle, spindle actuating means for moving said spindle along said axis, a workpiece supporting table movable along a path, and table drive means for moving said table along said path, the improvement comprising means for generating numerically controlled tapered threads and including:
- (1) a machining head mounted at the free end of said spindle, said head comprising
  - (a) means for mounting a single point tool thereon so that said tool will rotate with said spindle, and
  - (b) means for moving the tool on said head radially outwardly with respect to said axis in direct response to axial movement of said spindle in one direction, and for moving the tool radially inwardly with respect to said axis in direct response to axial movement of said spindle in the opposite direction;
- (2) position sensing means for sensing the rotational position of said spindle under all operating conditions thereof; and
- (3) numerical control means programmed to cause said spindle actuating means and said table drive means to operate in a predetermined relationship with each other and with the rotational position of said spindle to machine a contour on a workpiece disposed on said table, when said spindle is rotating.

11. In a machine tool including a rotatable tool-holding spindle assembly consisting of an axially fixed hollow outer spindle sleeve supporting and rotatably driving an axially movable inner spindle bar, spindle drive means for rotating said spindle assembly on its axis, spindle feeding means for moving said inner spindle bar along said axis, a workpiece supporting table movable along a path parallel to said axis, and table drive means for moving said table along said path, the improvement comprising means for numerically controlled generation of elements of rotation or of variable cross-sections along their length and including:
- (1) a tool-holding head mounted on the face of said axially fixed hollow outer spindle sleeve, said head comprising
  - (a) means for mounting a single-point tool thereon so that said tool will rotate with said spindle sleeve,
  - (b) means for moving the tool on said head radially outwardly with respect to said axis in direct response to axial movement of said inner spindle bar in one direction, and for moving the tool radially inwardly with respect to said axis in direct response to axial movement of said inner spindle bar in the opposite direction; and
- (2) numerical controlled means programmable to cause said inner spindle bar feeding means and said table drive means to operate simultaneously in a predetermined relationship to machine elements of rotation of variable cross-section on a workpiece disposed on said table, when said spindle assembly is rotating.

12. A machining head for a "bar-type" boring mill having an axially movable spindle bar supported within an axially fixed rotatable spindle sleeve, said head comprising:
- (a) a housing fixed to said spindle sleeve;
- (b) tool support means on said housing for mounting a tool for radial movement with respect to the axis of rotation of said sleeve; and
- (c) actuator means in said housing for connecting said spindle bar to said tool support means, said actuator means being operable to translate axial movement of said spindle bar into radial movement of said tool.

13. A machining head as claimed in claim 12, wherein said spindle bar is numerically controlled.

* * * * *